US011023907B2

(12) United States Patent
Dutta et al.

(10) Patent No.: US 11,023,907 B2
(45) Date of Patent: Jun. 1, 2021

(54) SYSTEMS, METHODS, AND APPARATUSES FOR IDENTIFYING DORMANCY RISK

(71) Applicant: VISA INTERNATIONAL SERVICE ASSOCIATION, San Francisco, CA (US)

(72) Inventors: Amitava Dutta, Sydney (AU); April Pabale Vergara, Singapore (SG); Abhisek Ghosh, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 117 days.

(21) Appl. No.: 16/561,241

(22) Filed: Sep. 5, 2019

(65) Prior Publication Data

US 2021/0073828 A1 Mar. 11, 2021

(51) Int. Cl.
*G06Q 30/02* (2012.01)
*G06Q 40/02* (2012.01)
*G06N 20/00* (2019.01)

(52) U.S. Cl.
CPC ......... *G06Q 30/0201* (2013.01); *G06N 20/00* (2019.01); *G06Q 30/0224* (2013.01); *G06Q 40/02* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 10,600,063 | B2 * | 3/2020 | Bracher | ................ H04M 15/43 |
| 2004/0117300 | A1 * | 6/2004 | Jones | ..................... G07F 7/025 |
| | | | | 705/39 |
| 2010/0161379 | A1 * | 6/2010 | Bene | ..................... G06Q 30/02 |
| | | | | 705/7.31 |
| 2011/0106607 | A1 * | 5/2011 | Alfonso | ............. G06Q 30/0224 |
| | | | | 705/14.25 |
| 2012/0053990 | A1 * | 3/2012 | Pereg | ..................... G06Q 40/02 |
| | | | | 705/7.31 |

(Continued)

OTHER PUBLICATIONS

Carling, Kenneth, Tor Jacobson, and Kasper Roszbach. "Dormancy risk and expected profits of consumer loans." Journal of Banking & Finance 25.4 (2001): 717-739. (Year: 2001).*

(Continued)

*Primary Examiner* — Alan S Miller
(74) *Attorney, Agent, or Firm* — Loeb & Loeb LLP

(57) ABSTRACT

A first plurality of consumers having a target event is identified. A first dataset and a second dataset for the first plurality of consumers are received. The first dataset comprises first transaction card data for each consumer in the first plurality of consumers for a first time period, where the first time period is prior to the target event. The second dataset comprises second transaction card data for each consumer in the first plurality of consumers during a second time period, where the second time period is after the target event. A first score for each consumer is calculated using the first transaction card data and a second score for each consumer is calculated using the second transaction card data. The first score is compared to the second score for each consumer. In response to a determination that the second score is a threshold lower than the first score, one or more consumers are identified as high dormancy risk.

20 Claims, 6 Drawing Sheets

(56) References Cited

U.S. PATENT DOCUMENTS

2013/0054306 A1* 2/2013 Bhalla .................... G06Q 30/02
    705/7.31
2014/0180810 A1* 6/2014 Boal ................. G06Q 30/0269
    705/14.53
2014/0180826 A1* 6/2014 Boal ................. G06Q 30/0245
    705/14.66
2017/0337567 A1* 11/2017 Bracher ................. H04L 67/10

OTHER PUBLICATIONS

Carling, Kenneth, Tor Jacobson, and Kasper Roszbach. "Duration of consumer loans and bank lending policy: dormancy versus default risk." No. 70. Sveriges Riksbank Working Paper Series, 1998. (Year: 1998).*

Hamilton, Robert, and J. Barry Howcroft. "A practical approach to maximizing customer retention in the credit card industry." Journal of Marketing Management 11.1-3 (1995): 151-163. (Year: 1995).*

Roszbach, Kasper. "Bank lending policy, credit scoring, and the survival of loans." Review of Economics and Statistics 86.4 (2004): 946-958. (Year: 2004).*

Hamilton, Robert, and Mosahid Khan. "Revolving credit card holders: Who are they and how can they be identified?." Service Industries Journal 21.3 (2001): 37-18. (Year: 2001).*

* cited by examiner

SYSTEMS, METHODS, AND APPARATUSES FOR IDENTIFYING DORMANCY RISK

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In general, an electronic transaction payment system has four key players: merchants, payment networks, acquiring banks (a.k.a. acquirers), and issuing banks (a.k.a. issuers). At a high level, a merchant provides a payment gateway, such as a point of sale (POS) terminal or a checkout page on its website or mobile app, where consumers can pay for selected goods and/or services using a transaction card or an electronic payment account such as a wallet account. An acquirer receives transaction data and account information from the transaction card, electronic payment account, and/or consumer via the merchant's payment gateway. The acquirer then sends the transaction data, the account information, and an authorization request to an issuer associated with the transaction card or electronic payment account via a payment network. The issuer approves or declines the authorization request and transaction amount and such information is sent back to the acquirer via the payment network. If the transaction is approved, funds are transferred from the consumer's account with the issuer and deposited into the merchant's account with the acquirer.

As noted above, the issuing bank or issuer is the financial institution that provides and maintains consumer/customer payment accounts and issues credit and/or debit cards to consumers on behalf of the card/payment networks (e.g., Visa, MasterCard, Discover). The issuer acts as the go-between for its customer account holder and the card/payment networks. The issuer handles payment authorizations and provides various ongoing services to its customers such as: sending card renewals, setting individual card limits, which it may increase or decrease over time, resolving disputes, activating new cards, and suspending accounts or blocking charges if necessary.

Issuers are also responsible for protecting customer personal information, financial data, and account access. Thus, issuing banks must maintain a high level of security and often monitor customer accounts for fraudulent behavior.

In addition, to these functions, the issuing bank also bears the burden if a customer defaults on his account balance as issuers are required to underwrite the risk. Thus, if a customer does not pay his card balance, the issuing bank must try and recoup the costs from the customer.

To offset the risks they take on, issuers make money in a variety of ways. For example, issuers may assess and/or collect penalties, annual fees, cash advance fees, balance transfer fees, foreign transaction fees, and interchange fees.

Because issuers rely on the health and activity of their customers to make money, there exists a need to minimize the number of defaulting, inactive, and/or closed customer accounts in order to prevent loss of revenue from such customer disengagement. Additionally, in some jurisdictions, government regulatory provisions on consumer privacy restrict issuers from initiating reactive marketing efforts directed to customers who have already closed their accounts. Furthermore, studies show that the longer a customer has gone inactive, the more difficult it is to win them back. Consequently, there exists a particular need to identify soon-to-be inactive customers as early as possible to enable issuers to develop and deploy trigger-based programs to those customers most in need of immediate attention.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a first plurality of consumers having a target event is identified. A first dataset for the first plurality of consumers is received. The first dataset comprises first transaction card data for each consumer in the first plurality of consumers for a first time period, where the first time period is prior to the target event. The first transaction card data comprises transaction amount and transaction count for each consumer during the first time period. A second dataset for the first plurality of consumers is received. The second dataset comprises second transaction card data for each consumer in the first plurality of consumers during a second time period, where the second time period is after the target event. The second transaction card data comprises transaction amount and transaction count for each consumer during the second time period. A first score for each consumer in the first plurality of consumers is calculated using the first transaction card data and a second score for each consumer in the first plurality of consumers using the second transaction card data. The first score for each of the consumers is compared to the second score for each of the consumers to determine one or more high dormancy risk (HDR) consumers within the first plurality of consumers. In response to a determination that the second score is a threshold lower than the first score for one or more consumers in the first plurality of consumers, one or more consumers in the first plurality of consumers is identified as high dormancy risk.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION

At a high level, the systems, methods, and apparatuses described herein are designed and built to attempt to identify consumers that are at high risk for dormancy. Currently, issuers do not have a reliable tool to predict which customers will go dormant in the near future. Traditional dormancy models only predict those consumer accounts that will go inactive. However, customers who have extreme increases or decreases in their overall engagement are also at risk for going dormant. Dormancy is a problem for issuers because it reduces revenue streams for the issuer, and in some cases, it prevents issuers from engaging in marketing efforts to win-back customers who have closed their accounts. Thus, there exists a need for a technology to help predict not only those customers that are likely to go inactive in the near future, but also those with extreme increases and decreases in activity to enable an issuer to create and implement target based retention strategies for those customers that require immediate attention.

Figure 1:
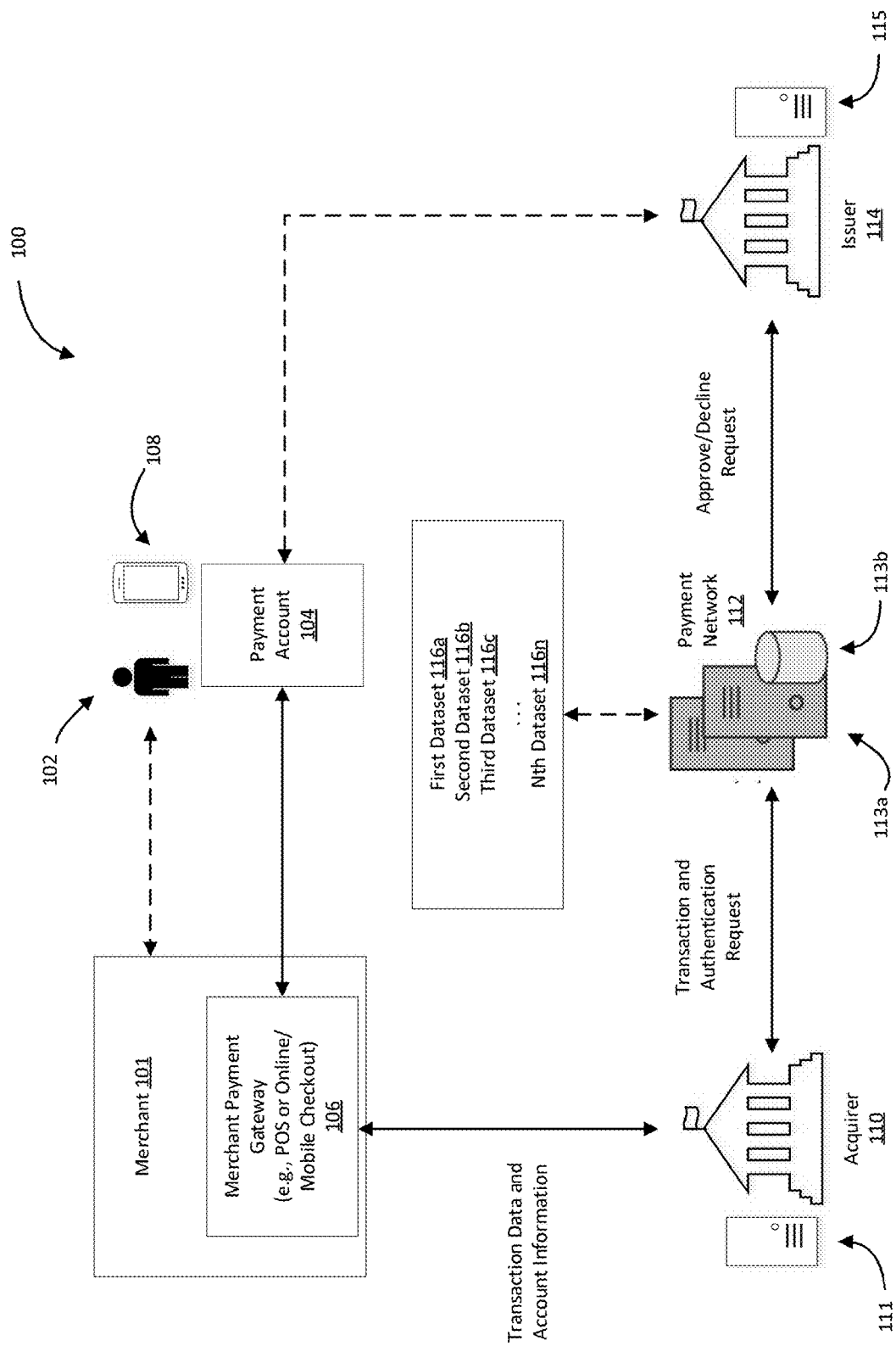
FIG. 1 illustrates a diagram of an exemplary electronic transaction payment system and network.

FIG. 1 generally illustrates an exemplary electronic transaction payment system 100. The electronic transaction system may include a merchant 101, which may have a merchant payment gateway 106. The merchant payment gateway 106 may be a POS device and/or an online or mobile portal where a consumer or customer 102 can select and pay for goods and/or services offered by or through the merchant 101. The consumer 102 may pay for his goods/services using cash, a transaction card associated with a payment account 104, and/or a digital wallet account associated with the payment account 104 via a user device 108.

The merchant payment gateway 106 may be in communication with an acquirer 110. The merchant payment gateway 106 may send transaction data including transaction amount and account information including payment account number, expiration date, CVV, zip code, and other information obtained at the merchant payment gateway 106 from the consumer, transaction card, and/or wallet account to the acquirer 110, which may have or be in communication with one or more payment processors 111.

The acquirer 110 may receive the transaction data and account information from the merchant payment gateway 106 and may send, via the payment processor 111, the transaction data and account information along with a transaction and authentication request to an issuing bank 114 via a payment network 112.

The payment network 112 may have one or more processors 113a and one or more databases 113b. The payment network 112 may serve as an intermediary between the acquirer 110 and the issuer 114 and may facilitate transactions between the merchant 101 and consumer 102. The payment network 112 may be a payment network such as Visa®, MasterCard®, American Express®, or Discover®.

The payment network 112 may obtain and store various data via its processors and databases 113a,b regarding the transactions it facilitates including data relating to consumer 102, payment account 104, merchant 101, acquirer 110, and issuer 114. For example, the payment network 112 may obtain and store data as one or more datasets 116a, b, c, . . . , n. The datasets 116a, b, c, . . . , n may include, for example, data relating to merchants, consumers, payment processing, acquirers, issuers, payment transactions, and the like. For example, the datasets 116a, b, c, . . . , n may include a plurality of usage attributes for consumers that may include, among others: overall spend behavior such as overall transaction amount and transaction count; merchant category usage such as transaction amount and transaction count for each Merchant Code Category (MCC) and/or transaction amount and transaction count for each merchant; cross-border activity such as cross-border transaction amount and transaction count; card-on-file usage such as transaction amount and transaction count for card-on-file accounts; channel usages such as transaction amount and transaction count for different channels, e.g., wallet account, contactless, online, mobile, traditional POS, and the like.

The payment account 104 may be issued by or otherwise associated with issuer 114. The issuer 114 may have one or more processors 115 and may authenticate the account information and check to see whether there are sufficient funds in the payment account 104 to cover the transaction amount. If the account information is authenticated and there are adequate funds in the payment account 104, then the issuer 114 may approve the transaction and authentication request. If the account information cannot be authenticated and/or the payment account 104 does not contain sufficient funds, then the transaction and authentication request may be declined by the issuer 114.

If the transaction is approved, then the issuer 114 may send the authentication confirmation to the acquirer 110 via the payment network 112 and may debit the payment account 104. The payment network 112 may handle the exchange of funds from the payment account 104 maintained by the issuer 114 to a deposit account for the merchant 101, which may be provided and maintained by the acquirer 110.

Figure 2:
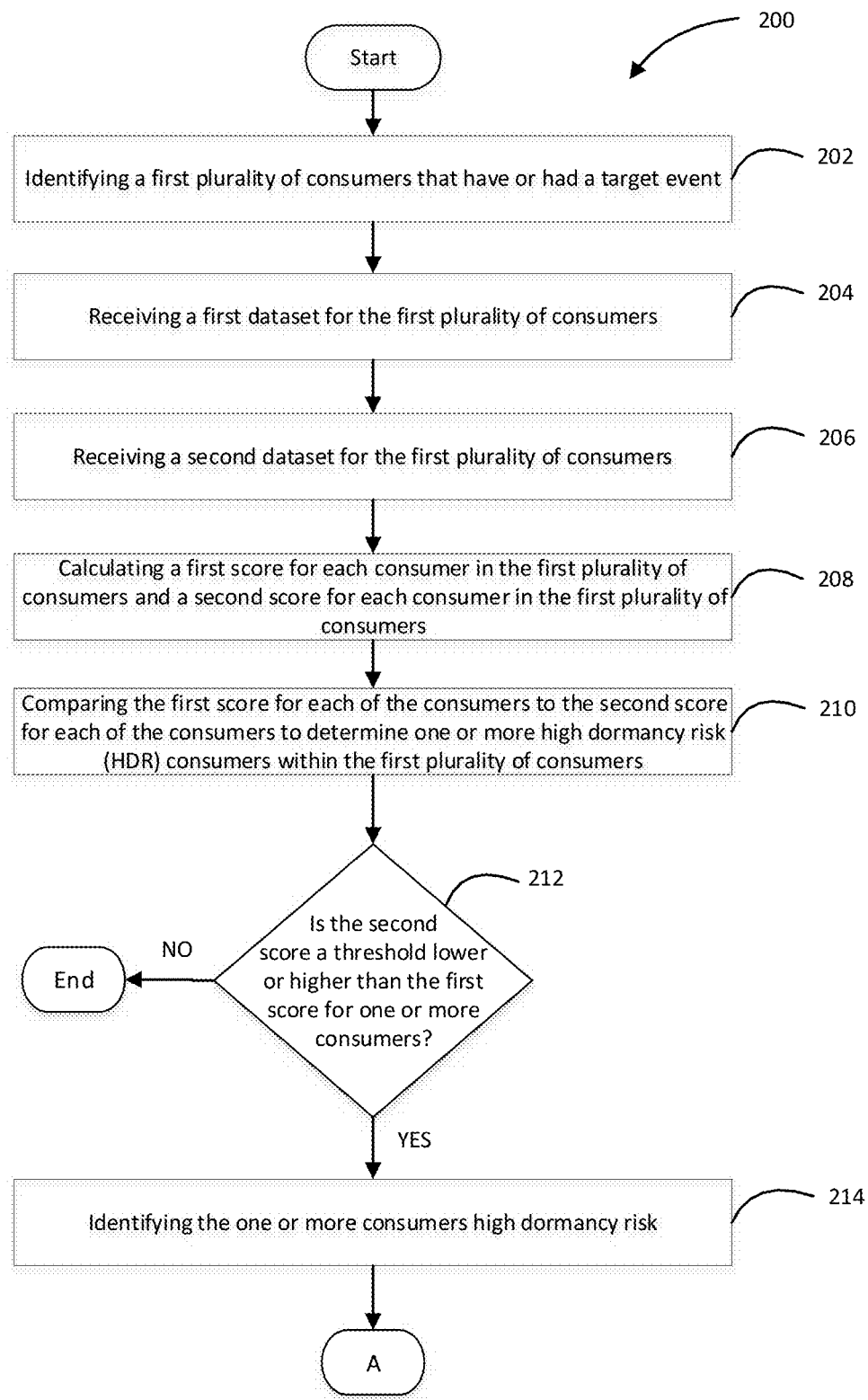
FIG. 2 is a flowchart of an embodiment of a method for identifying dormancy risk.
Figure 2A:
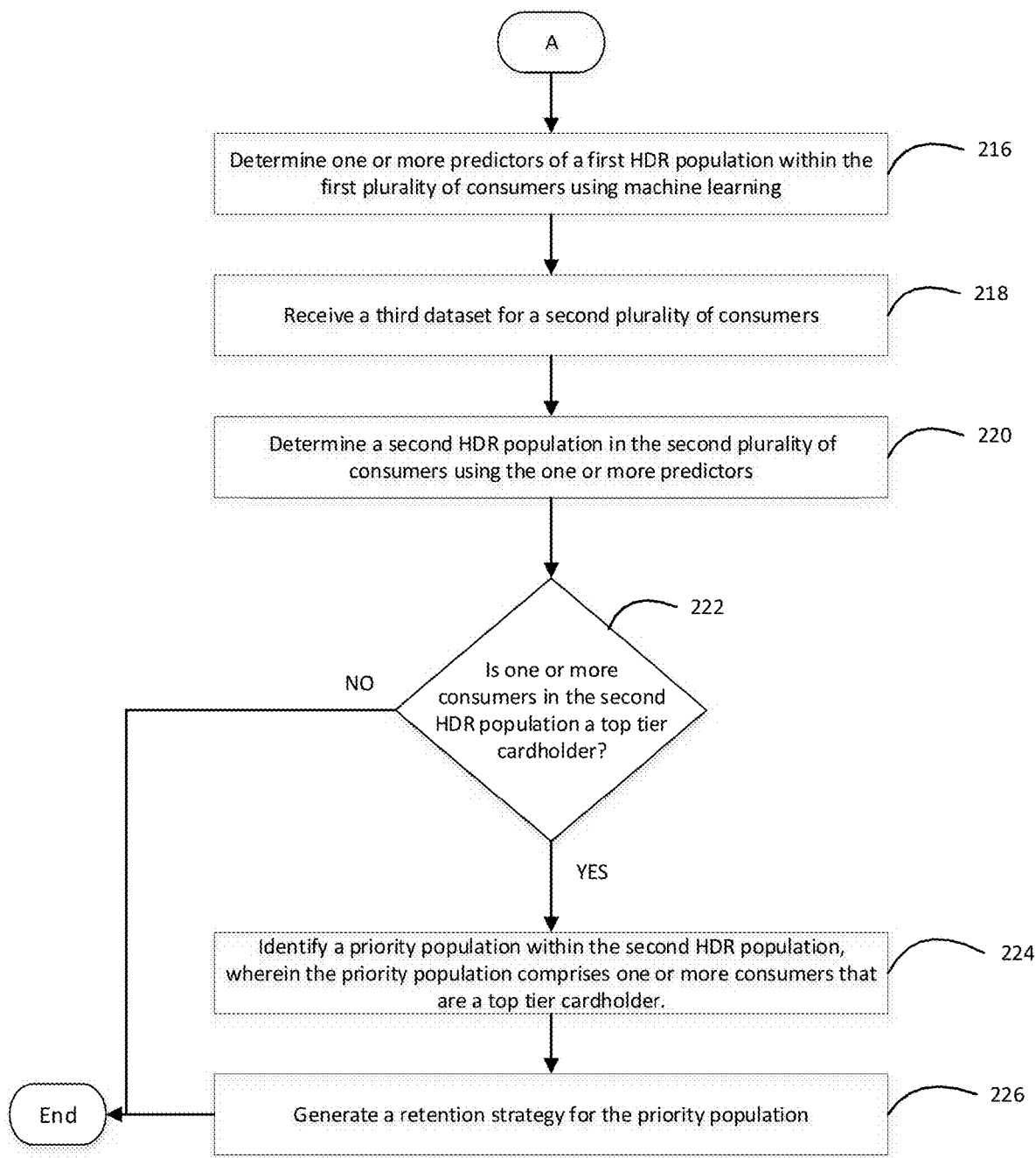
FIG. 2A is a flowchart of the method of FIG. 2.

FIG. 2 generally illustrates an exemplary method 200 for analyzing electronic payment accounts. At a block 202, a first plurality of consumers that have a target event may be identified. The target event may be a point at which there is a threshold decrease in transaction activity (e.g., transaction amount and/or number of transactions or transaction count) for each consumer in the first plurality of consumers. The threshold decrease may be, for example, a 80% to a 100% drop in transaction activity.

The target event may also be a point at which there is a threshold increase in transaction activity for each consumer in the first plurality of consumers. For example, the threshold increase may be an increase of two times or more in transaction activity. Analysis of past data may be used to assist in determining the threshold. The analysis may be specific to a customer population or geographic area.

Figure 4:
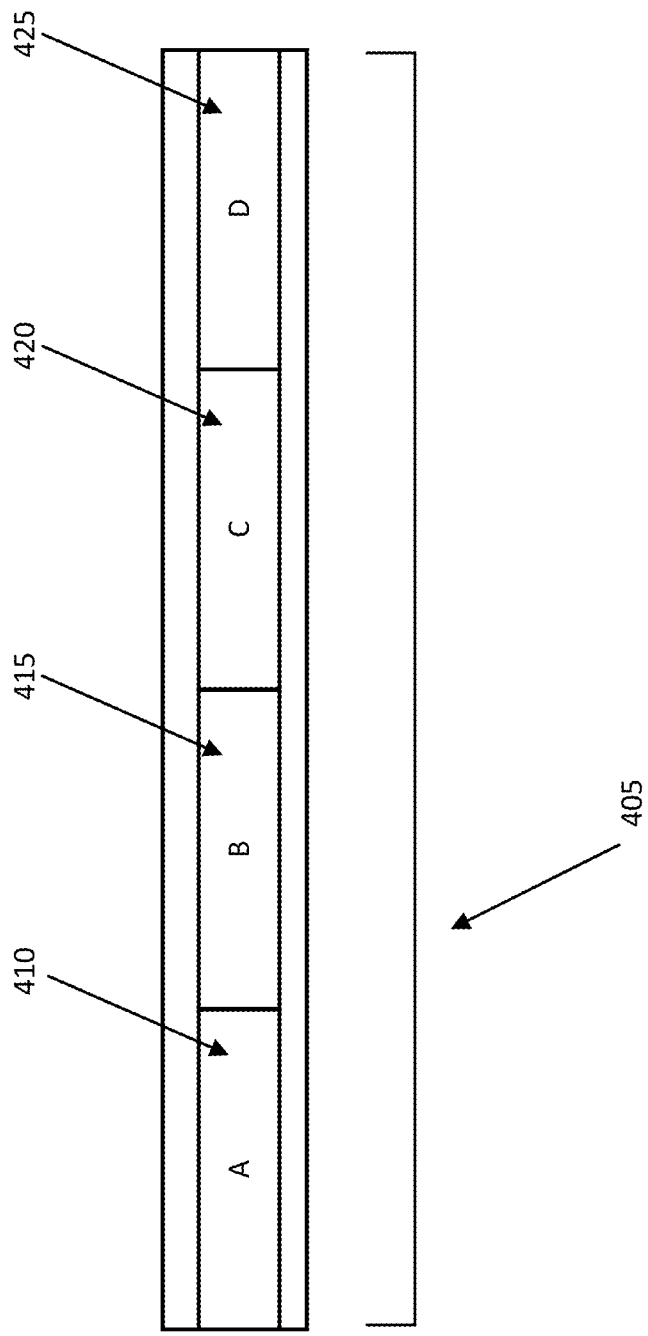
FIG. 4 is a schematic of an exemplary dataset to be used in machine learning; and, FIGS. 5A and 5B are schematics of exemplary machine learning methodologies.
Figure 5A:
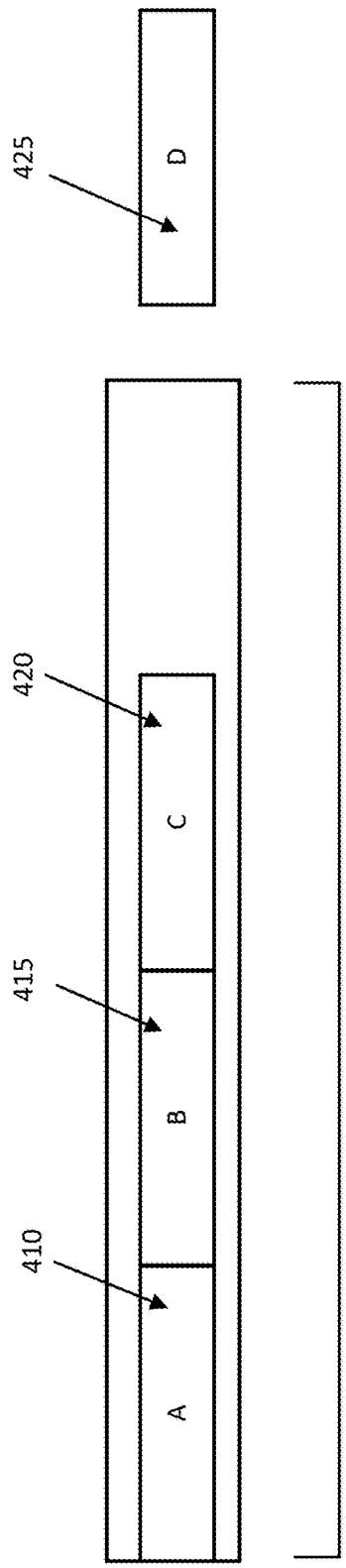
Figure 5B:
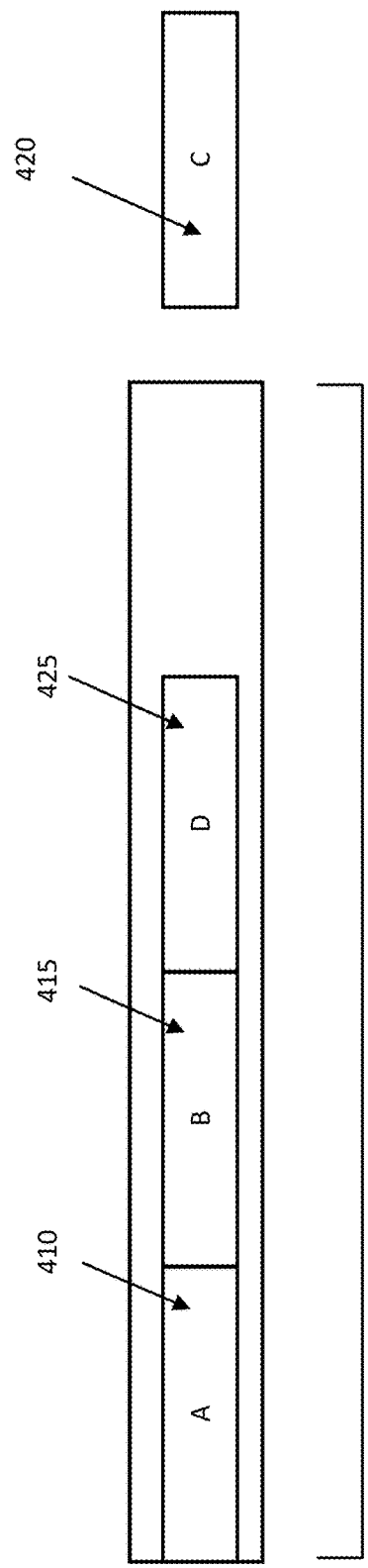

In some embodiments, the threshold may be refined over time. Machine learning may be used to analyze past thresholds in view of the actual results. Machine learning may be used to review a training group of past thresholds and determine improved thresholds moving forward. FIG. 4 may illustrate sample artificial intelligence (AI) training data according to one or more embodiments. As an example and not a limitation, an artificial intelligence system may trained by analyzing a set of training data 405. The training data may be broken into sets, such as set A 410, set B 415, set C 420 and set D 425. As illustrated in FIG. 5A, one set may be used as a testing data set (e.g., set D 425) and the remaining sets may be used as a training data set (e.g., set A 410, set B 415 and set C 420). The artificial intelligence system may analyze the training data set (e.g., set A 410, set B 415 and set C 420) and use the testing set (e.g., set D 425) to test the model created from the training data. The data sets may shift as illustrated in FIG. 5B, where the testing data set may be added to the training data sets (e.g., set A 410, set B 415 and set D 425) and one of the training data sets that has not been used to test before (e.g., set C 420) may be used as the testing data set. The analysis of the new training data (e.g., set A 410, set B 415 and set D 425) may occur again with the new testing set (e.g., set C 420) being used to test the model and the model may be refined. The rotation of data sets may occur repeatedly until all the datasets have been used as the test data set. The model then may be considered complete and the model may then be used on additional data sets.

At a block 204, a first dataset 116a for the first plurality of consumers may be received. The first dataset 116a may include first transaction card data for each consumer in the first plurality of consumers during a first time period. The first time period may be a time period that occurs prior to the target event. The first time period may also be any of 1 to 12 months, although other time periods are also contemplated (e.g., 12 to 24 months). Again, study of past accounts that went dormant, in active, or did not go dormant may be useful in determining an appropriate time period.

The first transaction card data may include transaction amount and transaction count for each consumer in the plurality of consumers during the first time period. For example, the first dataset 116a may include first transaction card data from a first time period that may be any of one to twelve months or more (e.g., January, January and February, January-March, . . . . , or January-December, etc.). The months may be consecutive and fall in the same calendar or different calendar years (e.g., 01/2016-04/2016, 01/2016-12/2016, 12/2016-05/2017, or 10/2016-09/2017).

At a block 206, a second dataset 116b for the first plurality of consumers may be received. The second dataset 116b may include second transaction card data for each consumer in the first plurality of consumers during a second time period. The second time period may come after the target event and/or the first time period. For example, the second time period may be any of 1 to 12 months, although other time periods are also contemplated (e.g., 12 to 24 months).

The second transaction card data may include transaction amount and transaction count for each consumer during the second time period. For example, the second dataset 116b may include second transaction card data from a second time period that may be any of one to twelve months or more (e.g., February, March and April, April-June, . . . . , or January-December, etc.). The months may be consecutive and fall in the same calendar or different calendar years (e.g., 01/2017-04/2017, 01/2017-12/2017, 12/2017-05/2018, or 10/2017-09/2018).

At a block 208, a first score for each consumer in the first plurality of consumers may be calculated using the first transaction card data and a second score for each consumer in the first plurality of consumers may be calculated using the second transaction card data. The first score may be calculated in a variety of ways and may be calculated in different ways for different issuers.

In one example, to calculate the first score, a first rank and a second rank for each consumer in the first plurality of consumers may be determined using the first transaction card data. The first rank for each consumer in the first plurality of consumers may be a ranking of all the consumers in the plurality of consumers based on the transaction amount for each consumer in a month i in the first time period, where i may be from 1 to n and n may be the total number of months in the first time period. For example, if the first time period is one month, then n is 1; if the first time period is two months, then n is 2; if the first time period is three months, then n is 3, and so on.

The second rank for each consumer in the first plurality of consumers may be a ranking of all the consumers in the first plurality of consumers based on the transaction count for each consumer during the month i in the first time period. Once both the first rank and the second rank for each consumer during the first time period is determined, a first composite rank for each consumer for each month i may be calculated by summing the first rank and the second rank for each consumer in month i. If there is more than one month i in the time period than the first rank, second rank, and first composite rank may be calculated for each month (e.g., month 1, month 2, month 3, etc.). Once the first composite rank for each month i is determined, the first score is calculated by taking the median of the first composite rank for months 1 to n.

The second score may be calculated in a similar manner. The second score may be calculated by determining a third rank and a fourth rank for each consumer in the first plurality of consumers using the second transaction card data. The third rank for each consumer in the first plurality of consumers may be a ranking of all the consumers in the plurality of consumers based on the transaction amount for each consumer in a month j in the second time period, where j may be from 1 to n and n may be the total number of months in the second time period. For example, if the second time period is one month, then n is 1; if the second time period is two months, then n is 2; if the second time period is three months, then n is 3, and so on.

The fourth rank for each consumer in the first plurality of consumers may be a ranking of all the consumers in the first plurality of consumers based on the transaction count for each consumer during the month j in the second time period. Once both the third rank and the fourth rank for each consumer during the second time period is determined, a second composite rank for each consumer for each month j may be calculated by summing the third rank and the fourth rank for each consumer in month j. If there is more than one month j in the time period than the third rank, fourth rank, and second composite rank may be calculated for each month (e.g., month 1, month 2, month 3, month 4, etc.). Once the second composite rank for each month j is determined, the second score is calculated by taking the median of the second composite rank for months 1 to n.

In one embodiment, the first time period may be a three month observation window that falls before the target event and the second time period may be a fourth month performance window that comes after the target event. The target event may be a decrease in transaction amount and/or transaction count for the first plurality of consumers.

To calculate the first score, in one example, the first rank and the second rank for each month in the first time period may be determined. The first rank for each consumer in the first plurality of consumers may be determined by ranking each consumer by transaction amount in month 1, ranking each consumer by transaction amount in month 2, and ranking each consumer by transaction amount in month 3 of the first time period. The second rank may be determined by ranking each consumer in the first plurality of consumers by transaction count in month 1, ranking each consumer by transaction count in month 2, and ranking each consumer by transaction count in month 3 of the first time period. A first composite rank may then be calculated for each month in the first time period by adding each consumer's first rank to their second rank for each of month 1, 2, and 3. Once the first composite rank for each consumer in each month 1, 2, and 3 are determined, a first score is calculated by taking the median of the first composite rank for month 1, month 2, and month 3.

To calculate the second score, the third rank and the fourth rank for each month in the second time period may be determined. The third rank for each consumer in the first plurality of consumers may be determined by ranking each consumer by transaction amount in month 1, ranking each consumer by transaction amount in month 2, ranking each consumer by transaction amount in month 3, and ranking each consumer by transaction amount in month 4 of the second time period. The fourth rank may be determined by ranking each consumer in the first plurality of consumers by transaction count in month 1, ranking each consumer by transaction count in month 2, ranking each consumer by transaction count in month 3, ranking each consumer by transaction count in month 4 of the second time period. A second composite rank may then be calculated for each month in the second time period by adding each consumer's third rank to their fourth rank for each of month 1, 2, 3, and 4. Once the second composite rank for each consumer in each month 1, 2, 3, and 4 are determined, a second score is calculated by taking the median of the second composite rank for month 1, month 2, month 3, and month 4.

At a block 210, the first score for each of the consumers in the first plurality of consumers may be compared to the second score for each of the consumers in the first plurality of consumers to determine one or more high dormancy risk (HDR) consumers within the first plurality of consumers.

At a block 212, a determination may be made as to whether the second score is a threshold lower than the first score for one or more consumers in the first plurality of consumers. The threshold lower may be, for example, a 60-65% decrease in the second score as compared to the first score. As mentioned previously, the threshold may be determined in whole or in part by studying past customer activity.

If one or more consumers in the first plurality of consumers have a second score that is a threshold lower or a threshold higher than the first score, then the one or more consumers may be identified as high dormancy risk at a block 214. Otherwise, the method may end.

At a block 216, one or more predictors of a first HDR population may be determined using the plurality of usage attributes for consumers identified as high dormancy risk The predictors may be generated using machine learning. Example, machine learning programs may include TreeNet® Gradient Boosting or eXtreme Gradient Boosting (XGBoost).

The one or more predictors may include, for example, a drop in merchant diversity in the first time period, a change in transaction amount during the first time period, a decrease in one or more merchant category code transactions during the first time period, and a change in transaction type during first time period. Other predictors may include, for example, spend in "everyday" merchant categories such as grocery stores and/or gas stations.

At a block 218, a third dataset 116c for a second plurality of consumers may be received. The third dataset 116c may also include one or more usage attributes for each consumer in the second plurality of consumers. As noted above, the usage attributes may include, for example: overall spend behavior such as overall transaction amount and transaction count; merchant category usage such as transaction amount and transaction count for each Merchant Code Category (MCC) and/or transaction amount and transaction count for each merchant; cross-border activity such as cross-border transaction amount and transaction count; card-on-file usage such as transaction amount and transaction count for card-on-file accounts; channel usages such as transaction amount and transaction count for different channels, e.g., wallet account, contactless, online, mobile, traditional POS, and the like.

At a block 220, a second HDR population in the second plurality of consumers may be determined using the one or more predictors in relation to the third dataset 116c.

At block 222, whether one or more consumers in the second HDR population is a top tier cardholder is determined. A top tier cardholder may be a cardholder that has a yearly transaction amount that is in a top threshold of all consumers in a jurisdiction. The top threshold may be the top 1% to top 25% of transactions for cardholders in the jurisdiction. The jurisdiction may be a city, county, state, providence, country, or region.

If one or more consumers in the second HDR population is a top tier cardholder, then a priority population within the second HDR population may be identified at a block 224. Otherwise, the method may end.

At a block 226, a retention strategy for the priority population may be generated. The retention strategy may include offers and incentives such as one or more of a decreased monthly interest rate on a cash balance, loyalty card points, a cash back amount, and a discount on a purchase. Other retention strategies may include, for example, converting total balance amount into installment payments, credit limit increases, and/or reassessment of product proposition.

A targeted retention strategy is desirable as it may prevent or decrease the number of accounts that go inactive or inactive and may prevent or decrease the number of "garners". Garners are customers who game the system by jumping from one issuer to another based on balance transfer offers in the market. Often garners are highly active immediately before they transfer their balance to a different issuer. Traditional dormancy models do not identify these types of customers as traditional models only identify inactivity. The current model is advantageous as it shows customers with increased spend that may indicate that they are garners as well as those customers with a significant drop in activity, e.g. the customer is still active but significantly less active than in prior months. Consumers with both behaviors are at risk for going dormant and well-timed targeted offers and incentives may help prevent the customer from going fully dormant.

The ability to address the technical problem of predicting a customer's future transaction activity may be just one of many a practical application of these technologies, which benefits issuers and customers. By using computer technology such as machine learning and artificial intelligence to study past customer accounts, determine factors that indicate an account is likely to go dormant or inactive, set thresholds and create automated solutions to try to address the potential dormant and inactive accounts, dormant and inactive accounts may be reduced. In the past, such accounts would just go dormant. Using the technological solutions described herein, factors which relate to possible dormant accounts may be recognized and possible accounts may be addressed with solutions that have been determined by computer technology to be effective in similar situations in the past.

In particular, issuers benefit as they are provided with a list of customers that are categorized based on predicted future dormancy risk, which the issuer can then use to create, offer, and implement targeted offers and/or incentives to identified high risk populations. This is particularly helpful for top-tier customers who are at risk for going dormant as they represent a significant loss of revenue. In addition, the target offers and incentives may reduce the risk of defaulting customers or customers that transfer their balances to other issuing bank, thereby further minimizing revenue loss. Customers benefit from receiving targeted offers and/or incentives, as such programs may provide the support they need to become active again. Customers that game the system may also benefit from receiving target offers or incentives as they can avoid the hassle of having to open a new account with a different issuer, transfer their balance, and then close their existing account.

The various devices and system components, such as user device 103, payment account 104, merchant payment gateway 106, acquirer 110, payment processor 111, payment network 112, and issuer 114, may be able to communicate via a communication network such as cellular service, through the Internet, a private network, etc., having a variety of communication channels. In some embodiments, the communication channels may be wired such as through an Ethernet cable, a USB cable or RJ6 cable. In other embodiments, the communication channels may be wireless such as through Wi-Fi (802.11 standard), Bluetooth, cellular communication or near field communication (NFC) devices. The communication between the devices and the other components of the systems may be direct or through a wireless network, e.g., Bluetooth, etc.

Figure 3:
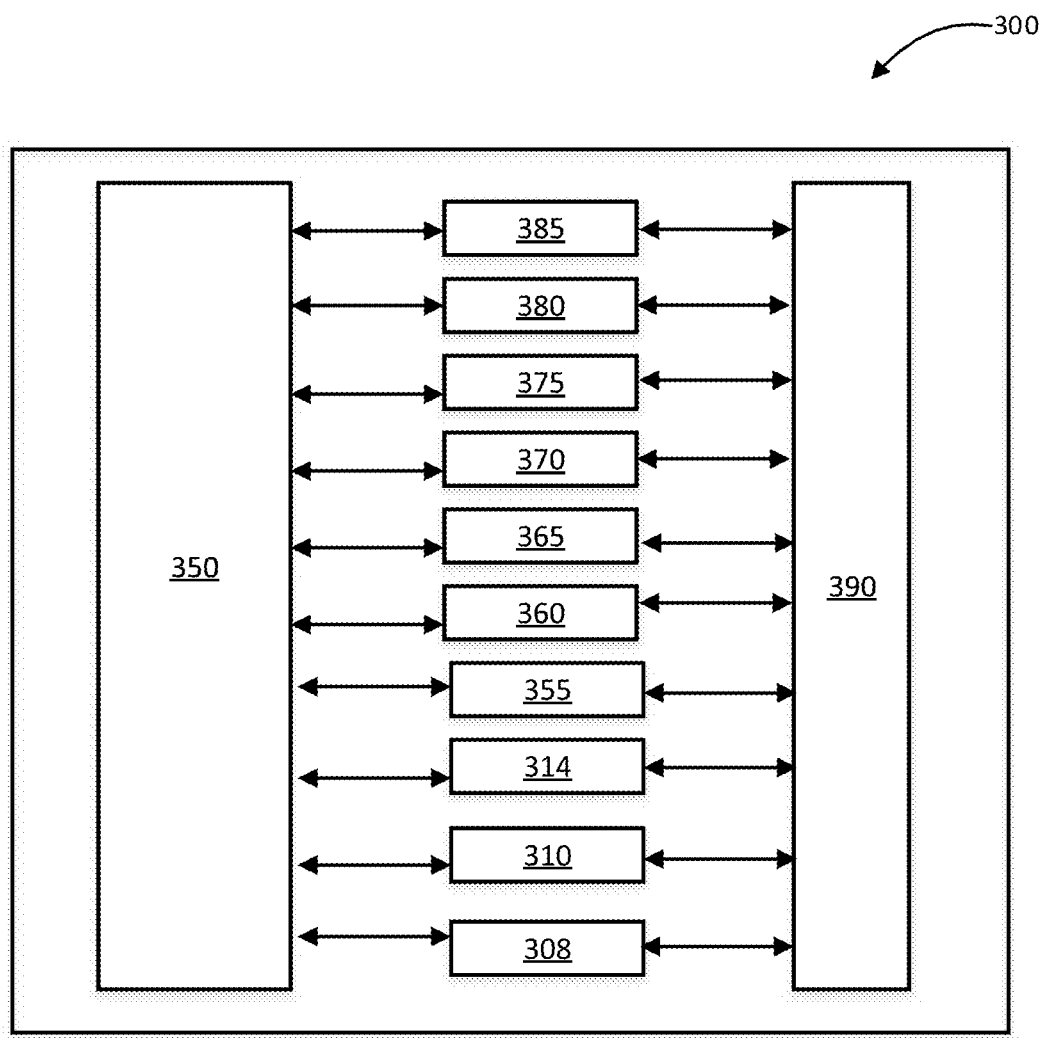
FIG. 3 is a block diagram of system components of an exemplary processor in a system for identifying dormancy risk.

FIG. 3 may be an example computing device 300, such as merchant payment gateway 106 or user device 108, that may be physically configured to interact with another computing device such as merchant payment gateway 106, payment processor 111, and various other components of system 100. The computing device 300 may have a processor 350 that is physically configured according to computer executable instructions. The computing device 300 may have a portable power supply 355 such as a battery which may be rechargeable. It may also have a sound and video module 360 which assists in displaying video and sound and may turn off when not in use to conserve power and battery life. The computing device 300 may also have volatile memory 365 and non-volatile memory 370, as well as internal storage 375 or external storage 380. The computing device 300 may have GPS capabilities 385 that may be a separate circuit or may be part of the processor 350. There also may be an input/output bus 390 that shuttles data to and from the various user input devices such as a camera 308, a receiver 310, and other inputs 314, etc. It also may control communicating with other computing devices and system components, either through wireless or wired devices. Of course, this is just one embodiment of the computing device 300 and the number and types of computing devices 300 is limited only by the imagination.

The electronic transaction payment system 100 may also have one or more processors such as payment processor 111, payment network processor 113a, or issuer processor 115, a memory, and an input output circuit. The one or more processors may be physically configured according to instructions to enable the communication, generation and interpretation of the information received by the merchant payment gateway 106 as well as information received and sent from the acquirer 110, the payment network 112, and issuer 114. The instructions to physically configure the processor to communicate, generate and interpret the information may be custom written, may be from a "white label" source or may be a combination of both.

As a result of the system, methods, and apparatuses disclosed herein, numerous technical problems may be addressed and solved. For example, by using the system, methods, and apparatuses disclosed, an issuer may use the high dormancy risk predictions to properly allocate computer system and processor resources to those customers that are not identified as being at high risk for dormancy so that the time it takes for account updates and transactions to be processed is not increased due to resources being dedicated to customers that are about to become inactive. In addition, the system, methods, and apparatuses disclosed may decrease the number of computer systems and processor cycles needed to maintain accounts that go inactive but are not closed and the processor cycles needed to close accounts that go dormant or those accounts that are closed because the customer transfers their balance to a different issuer. Further, the system, methods, and apparatuses disclosed may decrease the number of computer systems and processor cycles needed to process offers, which may be provided to current customers, that are irrelevant or inappropriate given the customer's future performance, e.g., offering increased credit lines to a customer that is about to transfer their account balance to another issuing bank.

In accordance with the provisions of the patent statutes and jurisprudence, exemplary configurations described above are considered to represent a preferred embodiment of the disclosure. However, it should be noted that the claimed method and systems can be practiced otherwise than as specifically illustrated and described without departing from its spirit or scope.

The computing devices, processors, and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The computing devices, processors, and/or servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, processors, and/or servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure and claims should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A computer-implemented method for analyzing electronic payment accounts, comprising:
    identifying a first plurality of consumers having a target event;
    receiving, via one or more processors, a first dataset for the first plurality of consumers, wherein:
    the first dataset comprises first transaction card data for each consumer in the first plurality of consumers for a first time period,
    the first time period is prior to the target event, and the first transaction card data comprises transaction amount and transaction count for each consumer during the first time period;
    receiving, via one or more processors, a second dataset for the first plurality of consumers, wherein:
    the second dataset comprises second transaction card data for each consumer in the first plurality of consumers during a second time period, the second time period is after the target event, and,
    the second transaction card data comprises transaction amount and transaction count for each consumer during the second time period;
    calculating a first score for each consumer in the first plurality of consumers using the first transaction card data and a second score for each consumer in the first plurality of consumers using the second transaction card data;
    comparing the first score for each of the consumers to the second score for each of the consumers to determine one or more high dormancy risk (HDR) consumers within the first plurality of consumers; and,
    determining a threshold by using an artificial intelligence system to analyze past thresholds to create a model, wherein the artificial intelligence system creates the model by using training data and then analyzes the model using a data test set and a plurality of data training sets;
    in response to a determination that the second score is a threshold lower than the first score by the threshold for one or more consumers in the first plurality of consumers,
    identifying one or more consumers in the first plurality of consumers as high dormancy risk.

2. The method of claim 1, wherein the target event is a point at which a threshold decrease in transaction activity occurred for each consumer in the first plurality of consumers.

3. The method of claim 1, wherein the first time period consists of one or more months n, and wherein calculating the first score further comprises;
- calculating a first rank for each consumer in the first plurality of consumers based on the transaction amount for the consumer in a month i in the first time period, wherein i is from 1 to n;
- calculating a second rank for each consumer in the first plurality of consumers based on transaction count for the consumer during the month i in the first time period;
- calculating a first composite rank for each consumer for the month i, wherein the first composite rank is a sum of the first rank and the second rank for the consumer in month i;
- repeating the calculation of the first rank, second rank, and first composite rank for each consumer for all months n in the first time period; and,
- calculating a first score for each consumer by calculating a median of the composite ranks 1 to n for each consumer.

4. The method of claim 3, wherein the first time period is any one of one to twelve months and n is any one of 1 to 12.

5. The method of claim 1, wherein the second time period consists of one or more months n, and wherein calculating the second score further comprises;
- calculating a third rank for each consumer in the first plurality of consumers based on the transaction amount for the consumer in a month j in the second time period, wherein j is from 1 to n;
- calculating a fourth rank for each consumer in the first plurality of consumers based on transaction count for the consumer during the month j in the second time period;
- calculating a second composite rank for each consumer for month j, wherein the second composite rank is a sum of the third rank and the fourth rank for the consumer in month j;
- repeating the calculation of the third rank, fourth rank, and second composite rank for each consumer for all months n in the second time period; and,
- calculating a second score for each consumer by calculating a median of the second composite ranks 1 to n for each consumer.

6. The method of claim 5, wherein the second time period is any one of one to twelve months and n is any one of 1 to 12.

7. The method of claim 1, wherein the first dataset comprises a plurality of usage attributes for each consumer in the first plurality of consumers, the method further comprising:
- determining, via one or more processors, one or more predictors of a first HDR population using the plurality of usage attributes for consumers identified as high dormancy risk, wherein the predictors are generated using machine learning.

8. The method of claim 7, wherein the one or more predictors comprise any of a drop in merchant diversity in the first time period, a change in transaction amount during the first time period, a decrease in one or more merchant category code transactions during the first time period, and a change in transaction type during first time period.

9. The method of claim 7, further comprising:
- receiving a third dataset for a second plurality of consumers, wherein the third dataset comprises one or more usage attributes for each consumer in the second plurality of consumers; and,
- determining a second HDR population in the second plurality of consumers using the one or more predictors.

10. The method of claim 9, further comprising:
- identifying a priority population within the second HDR population, wherein the priority population comprises one or more consumers that are a top tier cardholder, wherein a top tier cardholder is a cardholder that has a yearly transaction amount that is in a top threshold of all consumers in a jurisdiction; and
- in response to identifying a priority population,
  - generating a retention strategy for the priority population.

11. The method of claim 10, wherein a jurisdiction is a city, county, state, providence, country, or region.

12. The method of claim 10, wherein the retention strategy includes one or more of a decreased monthly interest rate on a cash balance, loyalty card points, a cash back amount, and a discount on a purchase.

13. A processor-readable non-transitory medium storing processor-issuable instructions configured to cause a processor to:
- identify a first plurality of consumers having a target event;
- receive a first dataset for the first plurality of consumers, wherein:
  - the first dataset comprises first transaction card data for each consumer in the first plurality of consumers for a first time period, the first time period is prior to the target event, and the first transaction card data comprises transaction amount and transaction count for each consumer during the first time period;
- receive a second dataset for the first plurality of consumers, wherein:
  - the second dataset comprises second transaction card data for each consumer in the first plurality of consumers during a second time period, the second time period is after the target event, and
  - the second transaction card data comprises transaction amount and transaction count for each consumer during the second time period;
- calculate a first score for each consumer in the first plurality of consumers using the first transaction card data and a second score for each consumer in the first plurality of consumers using the second transaction card data;
- comparing the first score for each of the consumers to the second score for each of the consumers to determine one or more high dormancy risk (HOR) consumers within the first plurality of consumers; and,
- determine a threshold by using an artificial intelligence system to analyze past thresholds to create a model, wherein the artificial intelligence system creates the model by using training data and then analyzes the model using a data test set and a plurality of data training sets;
- in response to a determination that the second score is a threshold lower than the first score for a consumer by the threshold,
- identify the consumer as high dormancy risk.

14. The processor-readable non-transitory medium of claim 13, wherein the target event is a point at which a threshold decrease in transaction activity occurred for each consumer in the first plurality of consumers.

15. The processor-readable non-transitory medium of claim 13, wherein the first time period consists of one or more months n, the processor-readable non-transitory medium further storing processor-issuable instructions configured to cause the processor to:
calculate a first rank for each consumer in the first plurality of consumers based on the transaction amount for the consumer in a month i in the first time period, wherein i is from 1 to n;
calculate a second rank for each consumer in the first plurality of consumers based on transaction count for the consumer during the month i in the first time period;
calculate a first composite rank for each consumer for the month i, wherein the first composite rank is a sum of the first rank and the second rank for the consumer in month i;
repeat the calculation of the first rank, second rank, and first composite rank for each consumer for all months n in the first time period; and
calculate a first score for each consumer by calculating a median of the composite ranks 1 to n for each consumer.

16. The processor-readable non-transitory medium of claim 13, wherein the second time period consists of one or more months n, the processor-readable non-transitory medium further storing processor-issuable instructions configured to cause the processor to:
calculating a third rank for each consumer in the first plurality of consumers based on the transaction amount for the consumer in a month j in the second time period, wherein j is from 1 to n;
calculating a fourth rank for each consumer in the first plurality of consumers based on transaction count for the consumer during the month j in the second time period;
calculating a second composite rank for each consumer for month j, wherein the second composite rank is a sum of the third rank and the fourth rank for the consumer in month j;
repeating the calculation of the third rank, fourth rank, and second composite rank for each consumer for all months n in the second time period; and,
calculating a second score for each consumer by calculating a median of the second composite ranks 1 to n for each consumer.

17. A system for analyzing electronic payment accounts, comprising;
one or more databases dynamically storing transaction card data for consumers;
a processor in communication with the one or more databases; and
a memory in communication with the processor and storing processor-issuable instructions to:
identify a first plurality of consumers having a target event;
receive a first dataset for the first plurality of consumers, wherein:
the first dataset comprises first transaction card data for each consumer in the first plurality of consumers for a first time period, the first time period is prior to the target event, and the first transaction card data comprises transaction amount and transaction count for each consumer during the first time period;
receive a second dataset for the first plurality of consumers, wherein:
the second dataset comprises second transaction card data for each consumer in the first plurality of consumers during a second time period, the second time period is after the target event, and,
the second transaction card data comprises transaction amount and transaction count for each consumer during the second time period;
calculate a first score for each consumer in the first plurality of consumers using the first transaction card data and a second score for each consumer in the first plurality of consumers using the second transaction card data; comparing the first score for each of the consumers to the second score for each of the consumers to determine one or more high dormancy risk (HOR) consumers within the first plurality of consumers; and,
determine a threshold by using an artificial intelligence system to analyze past thresholds to create a model, wherein the artificial intelligence system creates the model by using training data and then analyzes the model using a data test set and a plurality of data training sets;
in response to a determination that the second score is a threshold lower than the first score for a consumer by the threshold,
identify the consumer as high dormancy risk.

18. The system of claim 17, wherein the target event is a point at which a threshold decrease in transaction activity occurred for each consumer in the first plurality of consumers.

19. The system of claim 17, wherein the first time period consists of one or more months n, the memory further storing processor-issuable instructions to:
calculate a first rank for each consumer in the first plurality of consumers based on the transaction amount for the consumer in a month i in the first time period, wherein i is from 1 to n;
calculate a second rank for each consumer in the first plurality of consumers based on transaction count for the consumer during the month i in the first time period;
calculate a first composite rank for each consumer for the month i, wherein the first composite rank is a sum of the first rank and the second rank for the consumer in month i;
repeat the calculation of the first rank, second rank, and first composite rank for each consumer for all months n in the first time period; and,
calculate a first score for each consumer by calculating a median of the composite ranks 1 to n for each consumer.

20. The system of claim 17, wherein the second time period consists of one or more months n, the memory further storing processor-issuable instructions to:
calculate a third rank for each consumer in the first plurality of consumers based on the transaction amount for the consumer in a month j in the second time period, wherein j is from 1 to n;
calculate a fourth rank for each consumer in the first plurality of consumers based on transaction count for the consumer during the month j in the second time period;
calculate a second composite rank for each consumer for month j, wherein the second composite rank is a sum of the third rank and the fourth rank for the consumer in month j;

repeat the calculation of the third rank, fourth rank, and second composite rank for each consumer for all months n in the second time period; and, calculate a second score for each consumer by calculating a median of the second composite ranks 1 to n for each consumer.

\* \* \* \* \*